US012618812B2

(12) United States Patent
Plachetka

(10) Patent No.: US 12,618,812 B2
(45) Date of Patent: May 5, 2026

(54) FLUID MIXING BY FLUID SUPPLY LINES WITH LINE-SPECIFIC FLUID PUMPS FOR LIQUID CHROMATOGRAPHY

(71) Applicant: Agilent Technologies, Inc., Santa Clara, CA (US)

(72) Inventor: Clemens Plachetka, Malsch (DE)

(73) Assignee: Agilent Technologies, Inc., Santa Clara, CA (US)

( * ) Notice: Subject to any disclaimer, the term of this patent is extended or adjusted under 35 U.S.C. 154(b) by 1015 days.

(21) Appl. No.: 16/977,798

(22) PCT Filed: Mar. 1, 2019

(86) PCT No.: PCT/IB2019/051661
§ 371 (c)(1),
(2) Date: Sep. 2, 2020

(87) PCT Pub. No.: WO2019/167011
PCT Pub. Date: Sep. 6, 2019

(65) Prior Publication Data
US 2020/0400623 A1      Dec. 24, 2020

(30) Foreign Application Priority Data

Mar. 2, 2018    (DE) .................... 10 2018 104 842.4

(51) Int. Cl.
*G01N 30/34* (2006.01)
*B01D 15/16* (2006.01)
(Continued)

(52) U.S. Cl.
CPC ............. *G01N 30/34* (2013.01); *F04B 13/02* (2013.01); *F04B 23/04* (2013.01); *B01D 15/16* (2013.01);
(Continued)

(58) Field of Classification Search
CPC .............. G01N 30/34; G01N 35/1097; G01N 2030/027; G01N 2030/347; G01N 30/38;
(Continued)

(56) References Cited

U.S. PATENT DOCUMENTS 3,917,531 A * 11/1975 Magnussen .......... G05D 7/0676
                                                          417/43
4,116,046 A * 9/1978 Stein ...................... G01N 30/24
                                                          73/61.55
(Continued)

FOREIGN PATENT DOCUMENTS

CH           706929 A1     3/2014
CN      101281177 A      10/2008
(Continued)

OTHER PUBLICATIONS

Chinese Office Action and Search Report dated Mar. 18, 2022 for application No. 201980016428.6; 10 pages.
(Continued)

*Primary Examiner* — Mark A Laurenzi
*Assistant Examiner* — Benjamin Doyle

(57) ABSTRACT

A liquid chromatography fluid supply apparatus, for providing a mixture of a plurality of different fluids as a mobile phase for a liquid chromatography sample separation apparatus, includes a plurality of supply lines, a plurality of fluid pumps, and a combining point. Each of the supply lines is fluidically coupled to a respective one of a plurality of fluid component sources for providing a respective one of the fluids. Each of the fluid pumps is associated with a respective one of said supply lines. The fluids from the supply lines are to be merged at the combining point. Each of the fluid pumps conveys or does not convey a respective fluid from (Continued)

a respective one of the fluid component sources to the combining point, depending on a respective switching state of the fluid supply apparatus.

16 Claims, 2 Drawing Sheets

(51) Int. Cl.
| | | |
|---|---|---|
| *F04B 13/02* | (2006.01) | |
| *F04B 23/04* | (2006.01) | |
| *G01N 30/02* | (2006.01) | |
| *G01N 35/10* | (2006.01) | |

(52) U.S. Cl.
CPC . *G01N 2030/027* (2013.01); *G01N 2030/347* (2013.01); *G01N 35/1097* (2013.01)

(58) Field of Classification Search
CPC .......... F04B 13/02; F04B 23/04; F04B 23/06; F04B 23/10; F04B 23/106; B01D 15/16; B01D 15/166; B01D 15/18
USPC .................................................. 417/246, 216
See application file for complete search history.

(56) References Cited

U.S. PATENT DOCUMENTS

| | | | | | |
|---|---|---|---|---|---|
| 4,128,476 | A | * | 12/1978 | Rock | F04B 49/20 |
| | | | | | 210/659 |
| 4,310,420 | A | * | 1/1982 | Konishi | F04B 13/02 |
| | | | | | 210/659 |
| 4,311,586 | A | * | 1/1982 | Baldwin | B01D 15/08 |
| | | | | | 210/101 |
| 4,389,163 | A | * | 6/1983 | Magnussen, Jr. | B01D 15/14 |
| | | | | | 417/385 |
| 4,427,298 | A | * | 1/1984 | Fahy | G05D 11/132 |
| | | | | | 366/132 |
| 4,595,496 | A | * | 6/1986 | Carson | G05D 11/132 |
| | | | | | 210/101 |
| 4,963,075 | A | * | 10/1990 | Albertson | F04B 1/07 |
| | | | | | 417/221 |
| 4,981,597 | A | * | 1/1991 | Allington | G01N 30/34 |
| | | | | | 210/198.2 |
| 5,180,487 | A | * | 1/1993 | Saito | B01D 15/1814 |
| | | | | | 210/659 |
| 5,253,981 | A | * | 10/1993 | Yang | F04B 49/065 |
| | | | | | 417/18 |
| 5,360,320 | A | * | 11/1994 | Jameson | G05D 11/131 |
| | | | | | 417/4 |
| 5,664,938 | A | * | 9/1997 | Yang | F04B 49/065 |
| | | | | | 137/550 |
| 5,738,783 | A | * | 4/1998 | Shirota | G01N 30/34 |
| | | | | | 210/656 |
| 5,755,561 | A | * | 5/1998 | Couillard | F04B 13/02 |
| | | | | | 417/248 |
| 6,048,496 | A | * | 4/2000 | Zhou | B01F 33/8212 |
| | | | | | 366/338 |
| 6,260,407 | B1 | * | 7/2001 | Petro | G01N 30/30 |
| | | | | | 73/61.52 |
| 6,344,172 | B1 | * | 2/2002 | Afeyan | G01N 30/62 |
| | | | | | 422/527 |
| 6,427,526 | B1 | * | 8/2002 | Davison | B01D 15/12 |
| | | | | | 210/656 |
| 7,048,517 | B2 | * | 5/2006 | Berger | F04B 11/0091 |
| | | | | | 417/300 |
| 7,917,250 | B2 | * | 3/2011 | Pensak, Jr. | G01N 35/1097 |
| | | | | | 700/285 |
| 8,375,772 | B2 | * | 2/2013 | Fukuda | G01N 30/34 |
| | | | | | 73/61.55 |
| 9,417,219 | B2 | * | 8/2016 | Choikhet | G01N 30/34 |
| 9,459,239 | B2 | * | 10/2016 | Witt | G01N 30/34 |
| 9,751,060 | B2 | * | 9/2017 | Lutz | G05D 11/133 |
| 9,797,870 | B2 | * | 10/2017 | Tsukada | G01N 30/34 |
| 9,891,199 | B2 | * | 2/2018 | Sasano | G01N 1/4044 |
| 10,107,273 | B2 | * | 10/2018 | Witt | F04B 13/02 |
| 10,156,551 | B2 | * | 12/2018 | Cormier | G01N 30/24 |
| 10,238,989 | B2 | * | 3/2019 | Luongo | G01N 30/34 |
| 10,429,359 | B2 | * | 10/2019 | Eriksson | B01D 15/203 |
| 10,773,185 | B2 | * | 9/2020 | Olovsson | B01D 15/16 |
| 10,995,740 | B2 | * | 5/2021 | Yanagibayashi | F04B 13/02 |
| 11,075,019 | B2 | * | 7/2021 | Archibald | B01J 19/0093 |
| 11,385,208 | B2 | * | 7/2022 | Nogami | G01N 30/24 |
| 2002/0153312 | A1 | * | 10/2002 | Gjerde | B01D 15/366 |
| | | | | | 210/656 |
| 2003/0168392 | A1 | * | 9/2003 | Masuda | G01N 30/463 |
| | | | | | 422/70 |
| 2005/0008516 | A1 | * | 1/2005 | Richardson | G01N 30/32 |
| | | | | | 417/313 |
| 2005/0061722 | A1 | * | 3/2005 | Takao | G01N 30/32 |
| | | | | | 417/5 |
| 2005/0218055 | A1 | * | 10/2005 | Hayashi | G01N 30/463 |
| | | | | | 210/198.2 |
| 2008/0093300 | A1 | * | 4/2008 | Clarke | G01N 30/52 |
| | | | | | 436/86 |
| 2008/0245136 | A1 | * | 10/2008 | Gerhardt | B01D 15/163 |
| | | | | | 210/659 |
| 2008/0245715 | A1 | * | 10/2008 | Iwata | G01N 30/468 |
| | | | | | 210/198.2 |
| 2009/0175738 | A1 | * | 7/2009 | Shaimi | B01F 23/49 |
| | | | | | 417/248 |
| 2010/0143816 | A1 | * | 6/2010 | Saar | H01M 8/04089 |
| | | | | | 429/513 |
| 2010/0237235 | A1 | * | 9/2010 | Ozbal | G01N 30/7266 |
| | | | | | 250/288 |
| 2011/0049031 | A1 | * | 3/2011 | Cappiello | G01N 30/38 |
| | | | | | 210/198.2 |
| 2011/0116973 | A1 | * | 5/2011 | Choikhet | G01N 30/34 |
| | | | | | 422/81 |
| 2011/0132463 | A1 | * | 6/2011 | Witt | F04B 11/0058 |
| | | | | | 137/565.29 |
| 2012/0205314 | A1 | * | 8/2012 | Davison | G01N 30/34 |
| | | | | | 210/656 |
| 2012/0216632 | A1 | * | 8/2012 | Seki | G01N 30/24 |
| | | | | | 73/863.01 |
| 2012/0217192 | A1 | * | 8/2012 | Blank | B01D 15/166 |
| | | | | | 366/152.4 |
| 2012/0287746 | A1 | * | 11/2012 | Angelosanto | G01N 30/34 |
| | | | | | 366/177.1 |
| 2014/0251911 | A1 | * | 9/2014 | Skudas | B01D 15/3804 |
| | | | | | 210/656 |
| 2015/0089997 | A1 | * | 4/2015 | Nema | G01N 30/06 |
| | | | | | 73/23.4 |
| 2015/0165343 | A1 | * | 6/2015 | Geng | B01D 15/362 |
| | | | | | 210/85 |
| 2015/0165403 | A1 | * | 6/2015 | Lutz | B01F 35/22162 |
| | | | | | 366/160.1 |
| 2015/0219091 | A1 | * | 8/2015 | Jackson | G01N 30/34 |
| | | | | | 417/12 |
| 2015/0219603 | A1 | * | 8/2015 | Jackson | F04B 49/065 |
| | | | | | 700/282 |
| 2015/0268202 | A1 | * | 9/2015 | Gaita | F04B 23/04 |
| | | | | | 137/565.29 |
| 2015/0345484 | A1 | * | 12/2015 | Doebelin | F04B 53/10 |
| | | | | | 417/539 |
| 2016/0195564 | A1 | * | 7/2016 | Hewitson | G01N 30/06 |
| | | | | | 422/63 |
| 2017/0153210 | A1 | * | 6/2017 | Eriksson | B01D 15/34 |
| 2017/0326474 | A1 | * | 11/2017 | Olovsson | G01N 30/32 |
| 2019/0211813 | A1 | * | 7/2019 | Yanagibayashi | F04B 13/02 |

FOREIGN PATENT DOCUMENTS

| | | | |
|---|---|---|---|
| CN | 202693596 | U | 1/2013 |
| CN | 103336066 | A | 10/2013 |
| DE | 4412703 | A1 | 10/1995 |
| DE | 102015101597 | A1 | 8/2015 |
| DE | 102015101602 | A1 | 8/2015 |
| EP | 0309596 | A1 | 4/1989 |

(56)　　　　　　References Cited

FOREIGN PATENT DOCUMENTS

| EP | 0309596 | B1 | 3/1993 |
|----|---------|----|--------|
| WO | 2009092345 | A1 | 7/2009 |
| WO | 2014066769 | A1 | 5/2014 |

OTHER PUBLICATIONS

PCT International Search Report & Written Opinion mailed on Jul. 16, 2019.

\* cited by examiner

FLUID MIXING BY FLUID SUPPLY LINES WITH LINE-SPECIFIC FLUID PUMPS FOR LIQUID CHROMATOGRAPHY

RELATED APPLICATIONS

This application is the national stage under 35 U.S.C. 371 of International Application No. PCT/IB2019/051661, filed Mar. 1, 2019, which claims priority to German Application No. DE 10 2018 104 842.4, filed Mar. 2, 2018, the entire contents of both of which are incorporated by reference herein.

TECHNICAL BACKGROUND

The present invention relates to a liquid chromatography fluid supply apparatus, a liquid chromatography sample separation apparatus and a method for providing a mixture of several different fluids as a mobile phase for a liquid chromatography sample separation apparatus.

In an HPLC system, a liquid (mobile phase) is typically moved through a so-called stationary phase (for example in a chromatographic column) at a very precisely controlled flow rate (for example in the range of microlitres to milli-litres per minute) and at a high pressure (typically 20 to 1000 bar and beyond, currently up to 2000 bar), at which the compressibility of the liquid may be perceptible, in order to separate from one another individual fractions of a sample liquid that has been introduced into the mobile phase. After passing through the stationary phase, the separated fractions of the fluidic sample are detected in a detector. Such an HPLC system is known for example, from EP 0,309,596 B1 of the same applicant, Agilent Technologies, Inc.

For liquid chromatography and other applications of sample separation, it is necessary to perform a mixture of different fluids, for example different solvents, wherein the mixed fluid composition should be formed from these fluids in a well-defined manner.

Upstream of a fluid drive and/or a fluid conveying device (in particular a high-pressure chromatographic pump) there are plural solvent containers, from which solvents (such as water and ethanol) are provided for a chromatographic separation run (for example a gradient run). These fluids and/or solvents are accelerated under the influence of gravity when they move through fluid lines, through a proportioning device, to a mixing or combining point to the point of the high-pressure pump. Thus, gravitational effects and also the inertia of the fluid influence, in particular, the path between the solvent containers and the mixing point and/or the inlet of the high pressure pump. The filling level of the solvent containers can only be estimated if the flow carried out is integrated. Due to the described effects, the accuracy of the fluid composition depends on the storage height of the solvent containers and on their filling level. This also means that the accuracy of the operation of a liquid chromatogra-phy apparatus can deteriorate, if the height of the bottles relative to a mixing point or the tube geometry changes. Therefore, the height and filling level of the solvent con-tainers are correlated with the precision of a separation experiment using a liquid chromatography sample separa-tion apparatus. For reproducible results, it would therefore be necessary for users to always arrange solvents at a same elevated position. This impairs the flexibility of the opera-tion of a sample separation instrument as well as the reproducibility of separation results. The described gravita-tional effects as well as viscosity fluctuations of the fluids and the inertia of the fluids therefore thus lead to an inaccuracy in the solvent composition and consequently in the sample separation.

In addition, it has been found that in the described configuration, volume errors of the fluids to be mixed can occur upon switching the proportioning device. Therefore, the precise amount of liquid, which is supplied from a fluid line at the mixing or combining point, is sometimes unclear or inaccurate. It has also been found that in the described configuration, fluid can be diverted between fluid lines in an undesirable manner. The described parasitic effects lead to missing (or incorrect) volumes of the fluids to be mixed. In particular, pressure ratios between the solvent containers and the pump head may be undefined.

SUMMARY

It is an object of the invention to generate a composition of plural fluids to be mixed for the liquid chromatography under reproducible and defined conditions.

According to an exemplary execution example of the present invention, there is established a liquid chromatog-raphy fluid supply apparatus for providing a mixture of a plurality of different fluids as a mobile phase for a liquid chromatography sample separation apparatus, wherein the fluid supply apparatus has a plurality of supply lines, each of which is fluidically coupled to a respective one of a plurality of fluid component sources for providing a respective one of the fluids, a plurality of fluid pumps, each of which is associated with a respective one of said supply lines, and a combining point (or merging point, or point of union), at which the fluids from said supply lines are to be combined (or merged), wherein each of said plurality of fluid pumps conveys or does not convey a respective fluid from a respective one of said fluid component sources to said combining point depending on a respective switching state of said fluid supply apparatus.

According to another exemplary embodiment example, there is established a sample separation apparatus for sepa-rating a fluidic sample by liquid chromatography, wherein said sample separation apparatus has a fluid supply appara-tus having the above-described features for providing a mobile phase in the form of the fluids to be combined at the combining point, into which fluids the fluidic sample is to be injected, and a sample separation device, which is config-ured for separating the fluidic sample that is injected into the mobile phase into fractions.

According to yet another exemplary embodiment example, there is established a method for providing a mixture of a plurality of different fluids (in particular by a fluid supply apparatus, further in particular having the above-mentioned features) as a mobile phase for a liquid chromatography sample separation apparatus, wherein the method has a fluidically coupling of a respective one of a plurality of supply lines with a respective one of a plurality of fluid component sources for providing a respective one of the fluids, a providing of a plurality of fluid pumps, each of which is associated with a respective one of the supply lines for delivering the respective one of the fluids, a combining of the fluids from the supply lines at a combining point, and a sequentially supplying of the fluids from the supply lines to the combining point such that each of the plurality of fluid pumps conveys or does not convey a respective fluid from a respective one of the fluid component sources to the combining point depending on a respective switching state (in particular of the fluid supply apparatus).

In the context of the present application, the term "fluid" is understood in particular to refer to a liquid and/or a gas and/or a substance in the supercritical state, optionally having solid particles. Such a fluid can be used during the operation of a sample separation apparatus as an operating fluid, which is conveyed during the separation process through fluid lines of the sample separation apparatus by a fluid conveying device (for example a high-pressure pump). Such an operating fluid can be considered to be a mobile phase (i.e. a solvent or solvent composition), which can represent a carrier medium in the sample separation process and/or which can make a functional contribution to the sample separation process. This means that the mobile phase can carry along a fluidic sample to be separated as a carrier medium, but can also (for example in the context of a chromatographic separation process) make a functional contribution to the fractional separation of a fluidic sample that has been previously collected at a sample separation apparatus or thereby retarded.

In the context of the present invention, the term "packages of fluids" refers in particular to a temporal and spatial sequence of sections of fluids flowing one behind the other or sequentially in a fluid line, which sections differ from one another in respect of the substance and/or material of the respective fluid package. For example, a proportioning device (for example a proportioning valve) can alternately couple a line that carries the solvent composition to different supply lines, wherein a respective fluid package is coupled from a respective supply line into this line and conveyed. This results in a sequence of initially weakly mixed and separate fluid packets, which can then be mixed thoroughly.

According to an exemplary embodiment example of the invention, there is established a fluid supply apparatus for the liquid chromatography, in which plural fluids to be mixed are passed through corresponding supply lines and mixed at a combining point. With advantage, a fluid that is to be supplied at a certain point in time is actively conveyed by a fluid pump, which is specifically associated to a respective supply line, so that the fluid is transported by this fluid pump to the combining point and from there, for example, to a fluid conveying device (such as a fluidic high-pressure pump). Fluids, which are not to be provided at a certain point in time, cannot be conveyed in a corresponding switching state by fluid pumps, which are associated to corresponding other supply lines. In this way, the inactive fluid pumps represent, at a certain point in time according to an associated switching or operating state of the fluid supply apparatus, high fluidic restrictions, which do not or not significantly allow the corresponding fluid to be conveyed by the associated fluid pump and possibly by a fluid conveying device that is arranged downstream of the combining point. In contrast to this, a fluid pump that conveys a respective fluid forms a low fluidic restriction in an associated activated fluid line and in this way selectively conveys the associated fluid, possibly assisted by a fluid conveying device that is arranged downstream of the combining point. By this architecture, packages of fluids with a precisely defined fluid volume can be provided, which can be mixed together at the combining point. With advantage, such a fluid supply apparatus is as far as possible independent of a filling level or vertical height position of solvent reservoirs, which act as fluid component sources. Thus, a reproducible, fast and precise supply of a mixture of plural fluids is possible, independent of a filling level or a positioning of the fluid component sources with corresponding effects on the gravitational forces or mass inertia. An associated liquid chromatography sample separation apparatus can therefore work very precisely. In this way it is possible to avoid fluctuating and undefined conditions when adding solvents for forming a solvent composition and to perform the mixing of the fluids under reproducible and defined conditions. Also undesired pressure oscillations as well as the formation of disturbing gas bubbles in the solvent composition can be effectively suppressed and compensated with the architecture according to an exemplary execution example of the invention. By the fluid pumps, the fluid can be brought to a normalized initial pressure and then transferred to a downstream fluid conveying device, which is downstream of the combining point, and which can also serve as a dosing (or metering) device. Demonstratively, the fluid pumps, which serve as booster (or backing) pumps, can create a defined pressure level at the pump inlet between the fluid component sources and a fluid conveying device downstream of the combining point.

In the following, additional implementations of the fluid supply apparatus, the method, and the sample separation apparatus are described.

According to an embodiment example, each of the fluid pumps can be associated individually only to exactly a respective one of the supply lines. Also, each one of the supply lines can be associated individually only to exactly one of the fluid pumps. In contrast to this, the fluid conveying device described in more detail below can be assigned to all supply lines in common.

According to an embodiment example, each one of the plurality of fluid pumps can be embodied to be switchable (in particular, switchable on or off) (for example, controlled by a control device) so that, depending on its respective switching state (which can then correspond to the above-mentioned switching state of the fluid supply apparatus), a respective fluid pump conveys a respective fluid from a respective one of the fluid component sources to the combining point (namely when the corresponding fluid pump is switched on) or does not convey (namely when the corresponding fluid pump is switched off). If a respective one of the fluid pumps is switched on, associated fluid is delivered through the associated fluid line. If, on the other hand, one of the fluid pumps is switched off, it contributes to such a high fluidic resistance, even in relation to the currently active fluid pump, that even a fluid delivery device cannot convey a significant quantity of the associated fluid through the associated fluid line. Preferably, all but one of the fluid pumps can be switched off at a certain point in time, thus defining a fluid that is just delivered at this point in time. The fluid or booster pump, which is the only one active or switched on at a certain point in time, has, due to its running, by far the lowest fluidic resistance of all fluid supply channels. A potential leakage is negligible due to the high fluidic resistance of the switched-off fluid pumps and also due to the large difference in resistance of an active and inactive fluid feed pump described above.

Alternatively or in addition, the fluid supply apparatus can have at least one switching valve (preferably embodied as a fluid valve) (in particular one respective switching valve per fluid line), wherein each one of the plurality of fluid pumps runs continuously during operation, so that, depending on a respective switching state of the at least one switching valve (which then corresponds to the above-mentioned switching state of the fluid supply apparatus), a respective fluid pump conveys a respective fluid from a respective one of the fluid component sources to the combining point (namely when the corresponding fluid pump is switched on and the associated switching valve is opened) or does not convey (namely when the corresponding fluid pump is switched on or off and the associated switching valve is closed). According to this embodiment, also all fluid pumps in the fluid lines can remain switched on continuously, wherein (preferably exactly) one switching valve in a respective open state defines, which fluid from which fluid line is currently conveyed to the combining point.

According to an embodiment example, at least one fluidic capacity can be arranged between the plurality of fluid pumps and the at least one switching valve as a fluid reservoir or as a pressure reservoir. In this embodiment example, the connections from the fluid pumps to the optional proportioning valves can therefore also be deliberately provided with one or more fluidic capacities, which increase the maximum achievable flow rate of the dosing (or metering) unit and smooth the flow. Thereby, the maximum production speed of fluid compositions is also increased.

According to an embodiment example, the fluid, the constituents of which are to be mixed, can be a mobile phase, into which the fluidic sample to be separated is to be introduced during (in particular chromatographic) sample separation. Such a mobile phase can in particular be a solvent or a constant or variable solvent composition, which carries along the fluidic sample to be separated along the fluid lines of the sample separation apparatus. In a chromatographic separation experiment, for example, the mobile phase can, in a gradient operation after adsorbing fractions of the fluidic sample on a stationary phase of a sample separation apparatus, fractionally separate the fractions from the sample separation apparatus (such as a chromatographic separation column) by successively changing the solvent composition of the mobile phase. Alternatively, for example, an isocratic mode is also possible, in which the solvent composition can remain constant over time. The precise composition of the mobile phase has an influence on the flow rate and/or a conveyed amount of fluid volume. This influence in turn influences the accuracy of the separation result, in particular the position and amplitude (in particular height) of peaks in a chromatogram. By increasing the accuracy of the composition and the production rate of the mobile phase, more comparable separation data can be obtained and the separation result (for example a chromatogram in a chromatographic separation method) can become more precise.

According to an embodiment example of the invention, the fluid supply apparatus may have (in addition to the fluid pumps) have a fluid conveying device, which is downstream of the combining point, and which is configured for conveying the fluids as a mobile phase in the liquid chromatographic sample separation apparatus. In particular, the fluid conveying device, which extends over all channels and/or is provided in common for all supply lines, can be embodied for dosing (metering) the fluids conveyed by it. Such a fluid delivery device can be, for example, a high-pressure pump. It can be embodied as a piston pump or as an arrangement of several serial and/or parallel piston pumps. In such a piston pump, an associated piston reciprocates in a piston chamber and thereby conveys fluid at a position downstream of the combining point. In particular, two piston pumps, which are serial and operate in a fixed phase relationship with one another, can achieve a very homogeneous fluid composition. Such a fluid conveying device can convey the individual fluids through the fluid supply apparatus. With advantage, the fluid conveying device can be embodied for conveying the fluids (of which a mobile phase is composed) at a pressure of at least 500 bar, and in particular at least 1200 bar. Thus, the fluid conveying device can provide highest pressures, which is advantageous for modern HPLC or even UHPLC applications. This qualifies the fluid supply apparatus in a special way for implementation in a sample separation apparatus having highest requirements for fluids passed there through under high pressure, which is advantageous for HPLC applications or UHPLC applications, for example. For example, the fluid conveying device can be selected from a group that consists of a binary pump, a quaternary pump and a multi-channel pump.

According to an embodiment example, the fluid conveying device can be configured for taking up the fluids through the setups described here, in particular for targeted dosing (metering) into the pump chamber, starting from the combining point. Demonstratively, a fluid can thus be pushed (or inserted) into a pump chamber. The provision of a fluid conveying device downstream of the combining or mixing point of the fluid composition provided from the individual fluid component sources can, with advantage, care for that the fluid conveying device draws the fluids conveyed through the individual supply lines at this combining point with high suction force and/or, with application of overpressure to the fluid, absorbs it more precisely and releases it with further pressure application. According to such an implementation, the booster pumps can push with advantage, and the primary piston of the HPLC pump does not necessarily have to pull, but only needs to clear the way for the fluid. The pump can then have a dosing (metering) property. Only after closing the inlet valve at the pump head does the primary piston actively convey into the secondary piston. Due to the very different fluidic restrictions of the individual supply lines as a result of the different switching states of the individual fluid pumps, the fluid conveying device draws in a significant way only the fluid or fluids whose assigned fluid pumps and/or switching valves are currently in an active state. Influences of gravitational forces due to elevatedly arranged fluid component sources and the like are negligible compared to the effect of the individual fluid pumps in good approximation and do not disturb the accuracy of the fluid composition and/or the reproducibility of a sample separation run. The above mentioned, optional fluidic capacities can intercept increased volume demands by the pump and reduce the influence of parasitic restrictions in the suction path.

According to an embodiment example, the fluid supply apparatus may be free from a proportioning device (in particular between the fluid component sources and the combining point). Since the switching of the fluid pumps, which are assigned to the individual supply lines, already has a proportioning effect and, on the basis of the active time intervals and the sequence of active states of the individual fluid pumps, adjusts the size of the individual fluid packages to be mixed from the different fluids, the provision of a separate proportioning device is dispensable in the case of a particularly simple embodiment of the fluid supply apparatus. In this way, a particularly compact and easily operable fluid supply apparatus can be established.

According to an alternative embodiment example, the fluid supply apparatus can have, in addition to the line-specific fluid pumps, a proportioning device (in particular having at least one proportioning valve) for proportioning packages of the respective fluid supplied by the supply lines. The proportioning device can be formed by the at least one switching valve mentioned above (preferably a plurality of such switching valves, preferably one switching valve per supply line). In the case of a fluid supply apparatus with a particularly precise accuracy of the fluid composition, it is thus possible to additionally implement a proportioning device for proportioning the quantities of the fluids to be mixed in the fluidic path. Preferably such a proportioning device can be arranged downstream of the fluid pumps and upstream of the combining point, and can individually fluidically couple or decouple the individual supply lines with the combining point and thus a fluid conveying device arranged downstream of the combining point. A fluid pump in an active switching state can then, by such proportioning means, simultaneously define a selected fluid line, through which an associated fluid is supplied to the combining point. In this way, the proportioning device can precisely determine the individual fluid quantities of the fluids to be mixed, while the fluid pump in a respectively selected and/or active supply line makes the fluid composition substantially independent of gravitational effects, mass inertia effects and vibration phenomena, which are associated with a level and a height position of the individual fluid component sources.

According to an embodiment example, each of the plurality of (in particular individually switchable) fluid pumps can be arranged in a respective one of the supply lines. By implementing each of the fluid pumps in the associated fluid line, the optional high or low fluidic restriction thereof (associated with an inactive or active state of the fluid pump) can be used particularly precisely for a definition of a homogeneous and accurate fluid composition.

According to an embodiment example, each one of the fluid pumps in an active switching state can actively convey, in particular push, a respective fluid from a respective one of the fluid component sources to the combining point. Demonstratively, an actively switched fluid pump can suck the fluid from an associated fluid component source and, after passing through the fluid pump, push it toward the combining point. Behind the fluid pump, a sucking and/or pulling action of an advantageously provided fluid delivery device is then also effective.

According to an embodiment example, each one of the fluid pumps in an inactive switching state cannot pump any fluid from any one of the fluid component sources. If a fluid pump in an associated supply line is switched off, it forms such a high fluidic restriction that practically no fluid is conveyed through this supply line from the associated fluid component source in an inactive switching state of the fluid pump.

According to an embodiment example, each one of the fluid pumps can be embodied as a piston pump (or reciprocating pump), a gear pump (or toothed wheel pump), a peristaltic pump or a membrane pump (or diaphragm pump). Such a fluid pump can be embodied with little effort and can be uniquely associated to an associated channel and/or an associated supply line and can convey exclusively fluid from a fluid component source through this associated supply line.

According to an embodiment example, a degasser may be arranged between the plurality of fluid component sources and the fluid pumps. A degasser can, if necessary, remove gas, which is present in the solvents which are conveyed from the individual fluid component sources (in particular solvent containers) by an associated fluid pump and, if necessary, a common fluid conveying device, from the associated liquid. Such gas bubbles in a liquid solvent may affect the accuracy of a fluid composition. For example, such a degasser can fluidically couple the solvent to be conveyed through a permeable membrane with an exchange medium, so that gas bubbles in the liquid solvent diffuse into the exchange medium. The provision of a degasser upstream of the fluid pumps results in a particularly accurate fluid composition.

According to an embodiment example, the fluid supply apparatus may have one or plural pressure sensors for detecting a value that is indicative for a pressure in a respective one of the supply lines. Alternatively or in addition, the fluid supply apparatus may have at least one pressure sensor downstream of the combining point. The provision of pressure sensors (or alternatively flow sensors for detecting a flow rate, i.e. volume flow or mass flow of an associated fluid per unit time) allows a monitoring of the trouble-free operation of the fluid supply apparatus. The detection of pressure or flow rate in a respective supply line allows a monitoring as to whether, in accordance with a current switching state of the fluid pumps and/or switching valves, indeed only the fluid or the fluids, the fluid pump(s) of which is (are) actively switched, are conveyed to the combining point. In this way, the operation of the fluid supply apparatus can be made even more reliable.

According to an embodiment example, the fluid supply apparatus may have a respective switching valve in a respective one of the supply lines. By the switching valves, a multi-channel gradient valve, which can be used as a proportioning device, can be formed. The provision of an additional switching valve in a respective one of the supply lines can precisely carry out the definition as to which supply line is to currently supply a fluid alone. Such a switching valve can, for example, be transferred between an open state and a closed state, whereby an open state of the switching valve can correspond to a fluid delivery of the associated fluid pump. According to a preferred embodiment example, a control device is provided for the common control of the fluid pumps as well as the optional switching valves. With such a control logic, the functionality of the described components can be synchronized and/or coordinated.

According to an embodiment example, the fluid supply apparatus may have a non-return valve (or check valve) downstream of the combining point. Such a non-return valve can prevent an undesired backflow of pumped fluid from the combining point back into the individual supply lines. In other words, the non-return valve may be embodied to prevent a backflow of pumped fluid back in the direction towards the combining point. In this way, it is possible that no solvent can flow back into the individual supply lines in an undesirable manner. This further increases the reliability, accuracy and reproducibility of the fluid composition.

According to an embodiment example, the composition may include at least a first solvent, in particular water, and a second solvent, in particular an organic solvent.

According to an embodiment example, the fluid supply apparatus may have at least one sound sensor (in particular a plurality of sound sensors). The at least one sound sensor can be embodied for detecting a switching noise (which can occur, for example, when a fluid pump is switched and/or when a switching valve is switched) for monitoring the switching state of the fluid supply apparatus. In particular, the at least one sound sensor can be embodied for monitoring the switching state of at least one of the plurality of fluid pumps and/or for monitoring the switching state of the at least one switching valve. If plural, in particular exactly three or at least three sound sensors are provided, the association of a detected switching noise to a specific fluid pump or to a specific fluid valve can be carried out by triangulation. If the switching noises of the fluid supply apparatus are monitored with microphones or other sound sensors and the spatial position of a detected switching signal is determined by a directionally sensitive detection and/or computationally by triangulation or the like, an exact switching time can be determined. In this way, the correctness and precision of the control of the fluid supply apparatus can be monitored and corrected if necessary.

The sample separation apparatus can be a microfluidic measuring device, a life science device, a liquid chromatography device, an HPLC (High Performance Liquid Chromatography) device, a UHPLC system or an SFC (Supercritical Liquid Chromatography) device. However, many other applications are possible.

According to an embodiment example, the sample separation apparatus can be embodied as a chromatographic separation apparatus, in particular as a chromatography separation column. In the case of chromatographic separation, the chromatography separation column may be provided with an adsorption medium. The fluidic sample can be retained on this medium and only subsequently be dissolved again fraction by fraction in the presence of a specific solvent composition, thus effecting the separation of the sample into its fractions.

The pump system can, for example, be configured for conveying the fluid or mobile phase through the system at a high pressure, for example a few 100 bar up to 1000 bar and more.

The sample separation apparatus may have a sample injector for introducing the sample into the fluidic separation path. Such a sample injector may have an injection needle in a corresponding fluid path, which needle can be coupled to a seat, wherein the needle can be withdrawn from this seat to receive a sample, wherein after reinsertion of the needle into the seat the sample is in a fluid path which can be switched into the separation path of the system, for example by switching a valve, which results in the introduction of the sample into the fluidic separation path.

The sample separation apparatus may have a fraction collector for collecting the separated components. Such a fraction collector can, for example, lead the different components of the separated sample into different liquid containers. The analyzed sample can also be fed to a drainage container.

Preferably, the sample separation apparatus can have a detector for detecting the separated components. Such a detector can produce a signal, which can be observed and/or recorded, and which is indicative for the presence and amount of the sample components in the fluid flowing through the system.

BRIEF DESCRIPTION OF THE DRAWINGS

Other aims and many of the accompanying advantages of embodiment examples of the present invention will become easily perceptible and better understood with reference to the following more detailed description of embodiment examples in connection with the appended drawings. Features, which are substantially or functionally identical or similar, will be provided with the same reference numerals.

Figures 1, 2:
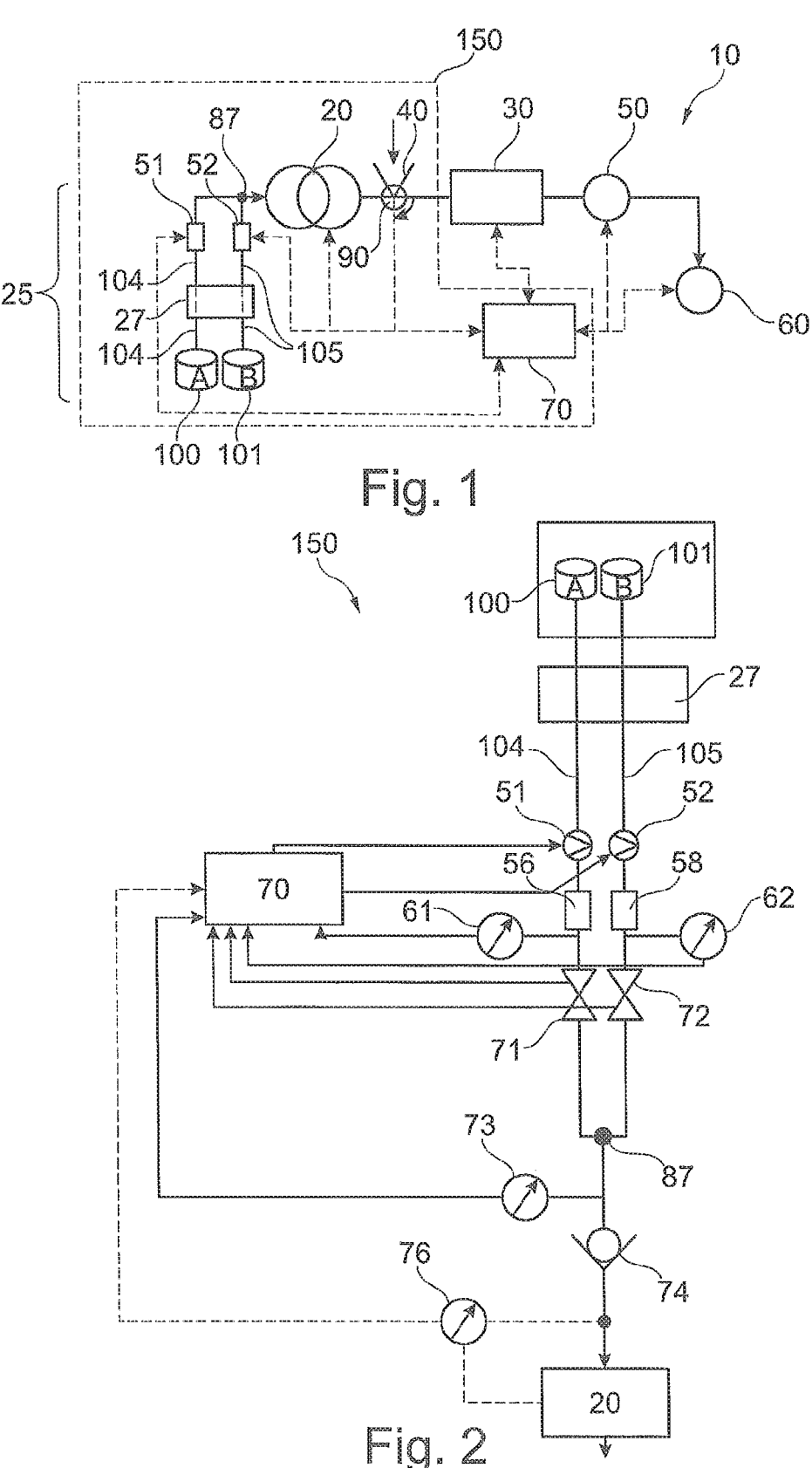
FIG. 1 shows an HPLC system having a fluid supply apparatus according to an exemplary embodiment example of the invention.
FIG. 2 shows a fluid supply system according to an exemplary embodiment example of the invention.

The representation in the drawing is schematic.

DETAILED DESCRIPTION

Before exemplary examples of execution are described with reference to the drawings, some basic considerations are to be summarized, based on which exemplary embodiment examples of the invention have been derived.

According to an exemplary embodiment example of the invention, in a fluid supply apparatus, individual fluid pumps are arranged in individual supply lines downstream of individual fluid component sources. By switching actively or inactively of the individual fluid pumps themselves and/or of line-specific switching valves operatively coupled therewith, a precise fluid composition can be achieved at a combining point of the supply lines, independently of gravitational effects concerning filling levels or position heights of the fluid component sources. The provision of such separate and line- or channel-specific fluid pumps avoids gas phases, because the liquids are supplied under pressure in a suction region upstream of a fluid conveying device (in particular a chromatographic high-pressure pump). In addition, this measure increases a suction speed of the fluids, which is caused and/or determined by the inlet pressure of the fluid pumps and a suction effect of the fluid conveying device. Disturbances due to varying and difficult to adjust fluid columns and the associated gravitational effects, which impair the reproducibility of a sample separation by a corresponding fluid supply apparatus, can be reduced or even eliminated according to exemplary embodiment examples. Also, disturbances, which are caused by the movement of fluid lines, can be reduced or even completely eliminated by the controlling effect of the fluid pumps. The sucking of the fluids can be carried out under strictly controlled and precisely defined conditions, which enables a particularly accurate dosing (metering of fluids). Demonstratively, according to an exemplary embodiment example, a multi-channel gradient pumping arrangement can be established from the fluid pumps, which are associated to the individual supply lines. In this way, a fluid composition of a mobile phase can be adjusted precisely and without disturbance, which enables a precise sample separation by a sample separation apparatus.

Demonstratively, according to an exemplary embodiment example, an associated fluid pump can be implemented in a respective supply line, which the fluid pump forms a very high hydraulic resistance and/or a high hydraulic restriction when the fluid pump is switched off. In comparison to this, a fluid pump, which is switched on at a certain point in time, represents a very low fluidic restriction in a supply line and conveys actively associated fluid or solvent to the combining or mixing point. Consequently, a fluid pump, which is switched on at a certain point in time, will dominate the solvent supply, if the other fluid pumps are switched off at the same time. As an alternative or in addition to switching a switching valve for selecting a desired solvent, fluid pumps and/or channel pumps can be implemented for this purpose. Gravitational artifacts can thus be avoided particularly reliably.

According to an exemplary embodiment example, one low-budget (low-cost) fluid pump can be provided per channel and/or supply line. Since the channel-related fluid pumps do not have to perform a dosing (metering) function—this can be performed by a downstream fluid conveying device (in particular a primary piston of a high-pressure double-piston pump)—the fluid pumps can be implemented with very little effort, because they only have to provide a channel-related pumping force and, for example, cannot perform a fine dosing (metering). Such a fluid pump, which is related to a respective supply line, can clearly provide a fixed or normalized pressure, and namely preferably independent of a filling level of solvent containers as well as independent of other gravitational effects and the like. Preferably such a fluid pump pushes the associated fluid to the mixing or combining point. A pushing of a fluid can be performed with a higher accuracy and with fewer artifacts than a pulling. In particular, a pushing rather than pulling fluid pump can better handle a residual gas that is contained in a solvent (which may still be present in the liquid even after passing through an optional degasser). Also, a pushing of the fluid towards the mixing or combining point allows a higher flow rate to be achieved than with a pulling operation. By an appropriate control of the channel-related fluid pumps and/or channel-related switching valves, normalized (or standardized) and/or defined inlet and mixing conditions can be achieved. According to an embodiment, a separate fluid pump can be implemented in each one of the supply lines, which fluid pump can be switched on for supplying fluid from an associated fluid component source to deliver said fluid. If the respective fluid pump of a supply line is switched off, then no fluid is currently being delivered from this supply line to the combining point. According to another embodiment, the fluid pumps in each supply line may be run, for example, continuously (i.e., remain on), while a respective fluid valve in each supply line may be opened to supply the associated fluid. If the respective fluid valve of a supply line is closed, then no fluid is currently being delivered from this supply line to the combining point.

FIG. 1 shows the principle structure of an HPLC system as an example of a liquid chromatography sample separation apparatus 10 according to an exemplary embodiment of the invention, as it can be used, for example, in liquid chromatography. A fluid conveying device 20, which is supplied with solvents from a supply device 25, drives a mobile phase through a sample separation device 30 (such as a chromatographic column), which contains a stationary phase. The supply device 25 has a first fluid component source 100 for providing a first fluid (for example water) and a second fluid component source 101 for providing another second fluid (for example an organic solvent). An optional degasser 27 can degas the solvents provided by the first fluid component source 100 and by the second fluid component source 101 before feeding them to the fluid conveying device 20. A sample introduction unit 40, which is also referred to as an injector, is arranged between the fluid conveying device 20 and the sample separation device 30 in order to introduce a sample liquid into the fluidic separation path. For this purpose, an injector valve 90 can be switched accordingly. The stationary phase of the sample separation device 30 is provided to separate components of the sample. A detector 50, which may include a flow cell, detects separated components of the sample, and a fractionating device 60 can be provided to discharge separated components of the sample into dedicated containers. Liquids that are no longer required can be discharged to a drainage container or to a waste (not shown).

While a fluid path between the fluid conveying device 20 and the sample separation device 30 is typically under high pressure, the sample liquid under normal pressure is first fed into a region, which is separated from the fluid path, a so-called sample loop, of the sample introduction unit 40 and/or injector, which in turn feeds the sample fluid into the fluid path that is under high pressure. During the feeding of the sample liquid, which is initially under normal pressure, in the sample loop to the liquid path, which is under high-pressure, the contents of the sample loop are brought to the system pressure of the HPLC sample separation apparatus 10. A control unit 70 controls the individual components 20, 25, 30, 40, 50, 60 of the sample separation apparatus 10.

FIG. 1 also shows a liquid chromatography fluid supply apparatus 150 for providing a mixture of plural different fluids as a solvent composition and/or mobile phase for the liquid chromatography sample separation apparatus 10. In the embodiment example shown, the fluid supply apparatus 150 has two supply lines 104, 105, each one of which is fluidically coupled to a respective one of two solvent containers, which are configured as fluid component sources 100, 101, for providing a respective one of the fluids and/or solvent components A and B. For example, solvent component A is water and solvent component B is an organic solvent (such as for example ethanol, methanol or acetonitrile). In each one of the supply lines 104, 105, there is implemented a respective fluid pump 51, 52 (and therefore associated to a respective one of the supply lines 104, 105), which is controllable and switchable by the control device 70. More specifically, the control device 70 can switch on each one of the fluid pumps 51, 52 at a particular point in time for conveying the associated solvent component A and/or B, respectively, or can switch off for deactivating the current conveying of the associated solvent component A and/or B, respectively. In particular, the control device 70 can switch on a maximum of one of the two fluid pumps 51, 52 at any given point in time, while the remaining at least one other one of the two fluid pumps 51, 52 is switched off. Consequently, a respective one of the fluid pumps 51, 52 conveys or does not convey the respective fluid or the respective solvent component A and/or B from a respective one of the fluid component sources 100, 101, depending on its respective switching state (demonstratively "on" or "off"). The respective fluid or the respective solvent component A and/or B is conveyed through the respective supply line 104 and/or 105, through the degasser 27 and through the respective fluid pump 51 and/or 52 to a mixing or combining point 87, at which the fluids or solvent components A and/or B from the supply lines 104, 105 are combined with each other. At the combining point 87, which can also be referred to as a combining mixing point, the fluid packages from the supply lines 104, 105 thus flow together, thereby forming a homogeneous solvent composition. The latter is then supplied to the fluid conveying device 20.

The control device 70 controls the switching states of the individual fluid pumps 51, 52. If the control device 70 switches a corresponding one of the fluid pumps 51, 52 into an active state or into a switched-on state, then fluid can flow from the associated fluid component source 100 and/or 101 through the associated supply line 104 and/or 105 and through the actively switched fluid pump 51 and/or 52 to the combining point 87. If, on the other hand, controlled by the control device 70, one of the fluid pumps 51 and/or 52 is switched to an inactive and/or switched-off state, then it does not actively convey fluid from the associated fluid component source 100 and/or 101 to the combining point 87, because the switched-off fluid pump 51 and/or 52 then represents a high fluidic restriction, which also prevents the fluid conveying device 20 from conveying appreciable quantities of the associated fluid to the combining point 87. Due to the pumping effect of the respective channel or fluid pump 51 and/or 52 in its switched-on state, gravitational effects, for example in connection with a filling level dependence of the fluid component sources 100 and/or 101 or with a height position of the same, can be strongly suppressed. The effect of the respective actively switched fluid pump 51, 52 dominates strongly over such then negligible gravitational effects.

FIG. 2 shows a fluid supply apparatus 150 according to an exemplary embodiment example of the invention.

According to FIG. 2, the fluids or solvent components A and/or B in the fluid component sources 100 and/or 101 are conveyed through the supply lines 104 and/or 105, respectively. Before the respective fluid reaches a respective one of the fluid pumps 51, 52 (if switched on) in a respective one of the supply lines 104 and/or 105, the respective fluid passes through a degasser 27, in order to remove unwanted gas bubbles from the respective fluid as far as possible. The respective fluid then flows (if opened) through a respective optional fluidic switching valve 71 and/or 72. Each one of the switching valves 71 and/or 72 can, for example, be embodied as a fluidic rotor valve having a stator component with fluid connections and a rotor component with corresponding fluid lines. The respective fluid then reaches the mixing or combining point 87 (for example, embodied as a fluidic T-piece) and finally a fluid conveying device 20 embodied as a high-pressure double piston pump 20 downstream of the combining point 87. Together with the fluid pumps 51, 52, the fluid conveying device 20 is configured to convey the fluids and simultaneously serves alone as a dosing (metering) device for dosing (metering) the respective fluid quantity. Demonstratively, the fluid conveying device 20 pulls (or draws) the fluids downstream from the combining point 87 at a pressure of, for example, 1000 bar. The solvent composition formed can then be supplied to a sample introduction device 40, which is arranged downstream of the fluid conveying device 20 and finally to a sample separation device 30 (compare FIG. 1).

The fluid pumps 51, 52 and the switching valves 71, 72 are switched by the control unit 70. In an active switching state of a respective fluid pump 51, 52 and a respective switching valve 71, 72, a respective fluid from a respective one of the fluid component sources 100, 101 is actively pressed by the respective fluid pump 51, 52 towards the combining point 87. In an inactive switching state of a respective fluid pump 51, 52 or a respective switching valve 71, 72, however, a respective fluid is not conveyed from a respective one of the fluid component sources 100, 101 to the fluid conveying device 20. Each one of the switching valves 71, 72 is arranged in a respective one of the supply lines 104, 105, and enables in an open state and/or disables in a closed state, respectively, a flow of the fluid through the associated supply line 104, 105.

If the optional switching valves 71, 72 are implemented in the supply lines 104, 105, the fluid pumps 51, 52 can run continuously, and the switching of the switching valves 71 or 72 by the control device 70 defines, from which supply line 104 or 105 fluid is currently supplied to the combining point 87. If, however, the optional switching valves 71, 72 are missing, the control device 70 can directly switch the fluid pumps 51, 52 on or off, in order thereby to selectively enable or prevent a supply of fluid from an associated supply line 104 and/or 105 to the combining point 87.

Pressure sensors 61, 62, which are connected to the supply lines 104, 105 and arranged downstream of the fluid pumps 51, 52, are provided for detecting a value that is indicative of a pressure in a respective one of the supply lines 104, 105. A pressure measurement by the pressure sensors 61, 62 demonstratively provides a diagnostics of the individual supply lines 104, 105. In addition, the fluid supply apparatus 150 as shown in FIG. 2 has a pressure sensor 73 downstream of the combining point 87. The pressure sensor 73 is also located upstream of the non-return valve 74, may be embodied to detect a pressure value at this point of the flow path, and may supply this pressure value to the control device 70 so that a compensation for any switching errors can be made based on the pressure value detected by the pressure sensor 73. Demonstratively, the pressure sensor 73 provides a signal that is indicative of whether the timing of the switching of the fluid pumps 51, 52 and/or the switching valves 71, 72 by the control device 70 has been correct. Reference numeral 76 represents a further optional pressure sensor, which is arranged downstream of the non-return valve 74 and may be provided alternatively or in addition to the pressure sensor 73 for diagnostic purposes.

Finally, the non-return valve 74, which is formed as an inlet valve to the fluid conveying device 20, is arranged downstream of the combining point 87, which prevents an undesirable backflow of fluid from the fluid conveying device 20 back in the direction towards the combining point 87. The fluid conveying device 20 may, for example, be formed as a double piston pump.

Since the compressibility is of secondary importance for the fluids or solvent components A and/or B at a low pressure of 1 bar by order of magnitude, the amount of fluid pulled in is directly determined by the movement of a primary piston (compare FIG. 3) of the fluid conveying device 20. Therefore, two pumping effects are combined according to an exemplary embodiment example: The channel or fluid pump 51 and/or 52 actively pushes the associated solvent component A and/or B into the piston of the fluid conveying device 20, while this piston contributes a supporting suction effect.

Optionally, but very advantageously, in the fluid supply apparatus 150 according to FIG. 2, fluid capacities 56, 58 can be arranged as fluid reservoirs or pressure reservoirs in the supply lines 104, 105 between the fluid pumps 51, 52 and the switching valves 71, 72. Such a pressure reservoir can therefore be located between the fluid pumps 51, 52 on the one hand and the switching valves 71, 72 on the other hand. The arrangement of one or more reservoirs in the form of a capacity 56, 58 can be effected either upstream or downstream of the pressure sensors 61, 62. By providing at least one such fluidic capacity 56, 58, an attainable conveying quantity can be increased and simultaneously the flow can be smoothed. In addition, this measure promotes a rapid creation of a fluid composition by the fluid supply apparatus 150. If one or more switching valves 71, 72 are additionally implemented, one or more capacities 56, 58 can be provided as pressure reservoirs, which enable an even faster suction through the respective switching valve 71, 72 and through the supply lines 104, 105. Examples are maximum rates from 100 ml/min for water. A pressure reservoir can also at least partially compensate for an optionally added filter.

Figure 3:
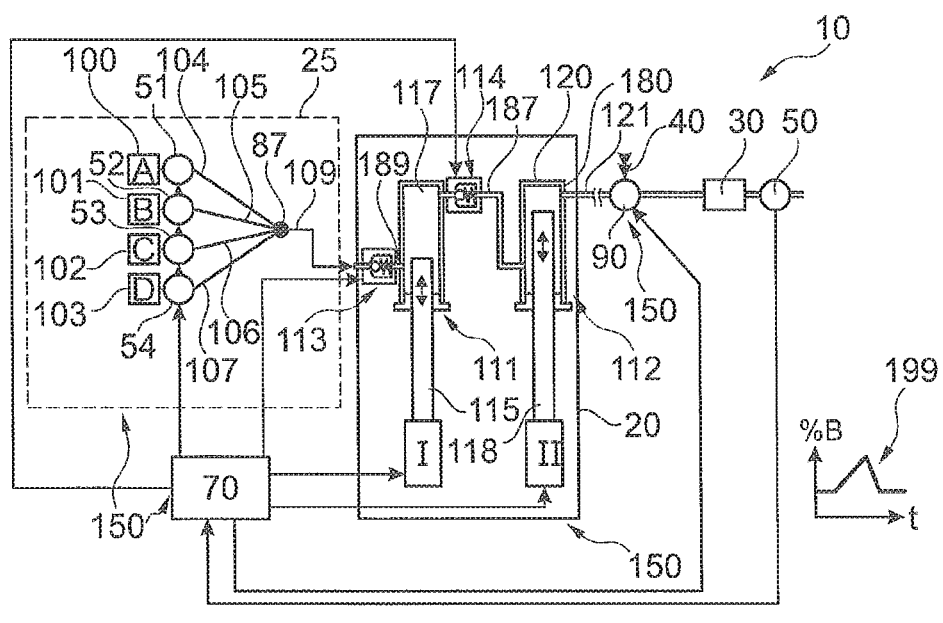
FIG. 3 shows a sample separation apparatus having a fluid supply system without a proportioning valve, according to an exemplary embodiment example of the invention.

FIG. 3 shows a sample separation apparatus 10 having a fluid supply apparatus 150 without a proportioning valve (see reference numeral 108 in FIG. 4) according to an exemplary embodiment of the invention. In the embodiment example according to FIG. 3, the fluid supply apparatus 150 is thus free of a proportioning device 108.

FIG. 3 shows the fluid supply apparatus 150 for providing a precise and time-varying fluid composition (in the example shown, a mobile phase) at a fluid consumer (in the example shown, the sample separation device 30 or the detector 50 of the sample separation apparatus 10 according to FIG. 1). The time dependence of the provided fluid composition to the sample separation device 30 is shown schematically in FIG. 3 with the reference numeral 199. The time-variable fluid composition as shown in FIG. 3 is used, for example, to run through a gradient profile 199 having the characteristics shown in FIG. 3. In the gradient profile 199, the percentage % B of the fluid component B for the example of a mixture with the fluid component A varies as a function of time t. For other applications, other fluid compositions may be desired, for example, from all possible components A, B, C and D. It is also possible to provide a fluid composition that is constant over time, for example in an isocratic separation mode.

The feeding device 25 has four supply lines 104 to 107 according to FIG. 3, each of which is fluidically coupled to a respective one of four fluid component sources 100 to 103 for providing a respective fluidic component A to D. The individual fluid packages arrive at a combining point 87.

The control device 70 controls each one of the fluid pumps 51 to 54 in the four supply lines 104 to 107 in a channel-specific manner so that sequences of fluid packages of one or some of the components A, B, C and D (for example, components A and B according to the gradient profile 199) flow successively through an inlet valve 113 and through the inlet 189 of a primary piston pump 111.

The primary piston pump 111 (see also reference symbol "I"), to which fluid to be pumped with a time-varying solvent composition can be supplied in packets by the feeding device 25, has a primary piston 115, which is reciprocably arranged in a primary piston chamber 117 for pumping the fluid. The primary piston 115 as well as a fluid valve 114 (in a fluidic connecting line 187), which is arranged between the primary piston pump 111 and a secondary piston pump 112 (see also reference sign "II"), for enabling or preventing fluid communication between the two piston pumps 111, 112, are also controllable by the control device 70. However, the fluid valve 114 can also be embodied passively. The secondary piston pump 112 can be supplied with fluid pumped by the primary piston pump 111 while the fluid valve 114 is open. The secondary piston pump 112 has a secondary piston 118, which is arranged in a reciprocating manner in a secondary piston chamber 120 for pumping the fluid, and which is also controllable by the control device 70, and provides, at its outlet 180, fluid, which flows through a fluid line 121 to the injector 40 and finally into the sample separation device 30 and then into the detector 50.

The fluid supply apparatus 150 is thus used to supply the sample separation apparatus 10 (which includes the sample separation device 30 and the detector 50) for separating a fluidic sample with mobile phase. The fluidic sample is introduced/inserted into the mobile phase by the injector and/or the sample introduction unit 40 through a corresponding circuit of an injector valve 90.

The control device 70 is used, according to FIG. 3, for controlling the entire sample separation apparatus 10, in particular the piston pumps 111, 112, the valves 113, 114 and the injector valve 90 as well as the fluid pumps 51 to 54. The fluid conveying device 20 is configured, according to FIG. 3, as a high-pressure pump for delivering the mobile phase with a pressure of, for example, 1200 bar.

Figure 4:
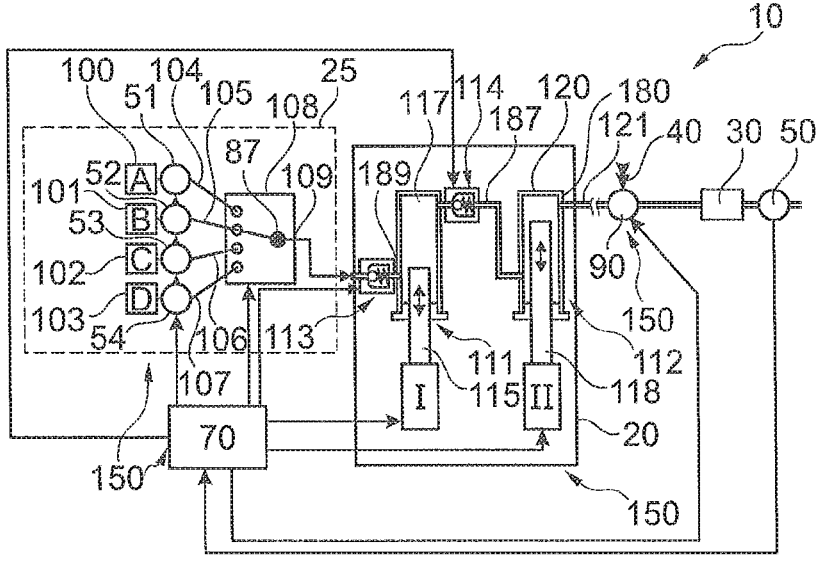
FIG. 4 shows a sample separation apparatus having a fluid supply system with a proportioning valve, according to another exemplary embodiment example of the invention.

FIG. 3 thus shows an embodiment example, wherein a precise fluid composition is enabled without the provision of a proportioning device 108 (compare FIG. 4). Instead, according to FIG. 3, a fluid composition is achieved simply by activating one of the four fluid pumps 51 to 54 and at the same time supporting the sucking action of the fluid conveying device 20. Since all of the fluid pumps 51 to 54, which are not activated at a certain point in time, form such a high fluidic resistance that the fluid A, B, C, or D that is conveyed through the associated supply line 104 to 107 is negligible, a selection of a fluid A, B, C, or D, which is to be pumped at a certain point in time, can be made by activating or switching on one of the fluid pumps 51 to 54.

FIG. 4 shows a sample separation apparatus 10 having a fluid supply apparatus 150 having a proportioning valve 108 according to another exemplary embodiment example of the invention. In the embodiment example of FIG. 4, the fluid supply apparatus 150 additionally has a proportioning device 108 with a proportioning valve, and is used for proportioning packages of the respective one of the fluids supplied by the supply lines 104 to 107.

The proportioning device 108 is arranged between the supply lines 104 to 107 and the inlet 189 of the primary piston pump 111. The proportioning device 108 is controllable by the control device 70 for modulating the composition of the fluid from packages of the fluidic components A to D upstream of the primary piston pump 111 by sequentially coupling selected ones of the supply lines 104 to 107 to the primary piston pump 111.

This means that the control device 70 controls the proportioning device 108 (in particular according to a multiplexer scheme) in such a way that sequences of fluid packets of one or some of the components A, B, C and D (for example of the components A and B according to the gradient profile 199) flow successively through an inlet valve 113 and through the inlet 189 of the primary piston pump 111. Before this, the individual fluid packages arrive at a combining point 87 at the outlet of the proportioning device 108.

According to FIG. 4, there is established a fluid supply apparatus 150 having an even more precise provision of a solvent composition. The embodiment example according to FIG. 4 differs from that according to FIG. 3 in that the proportioning device 108 is now provided. The proportioning device 108 fluidically couples the combining point 87 at any given time to only one of the supply lines 104 to 107, depending on the switching state of the switching valves (cf. reference numerals 71, 72 in FIG. 2) of the proportioning device 108. In this way, according to FIG. 4, the principle of multi-channel gradient pumps in the form of the fluid pumps 51 to 54 can demonstratively be synergistically combined with the principle of a multi-channel gradient valve in the form of the proportioning device 108. The proportioning device 108 can then actively open and/or close a flow path of the fluid and can thus provide a valve effect for each individual channel.

Figure 5:
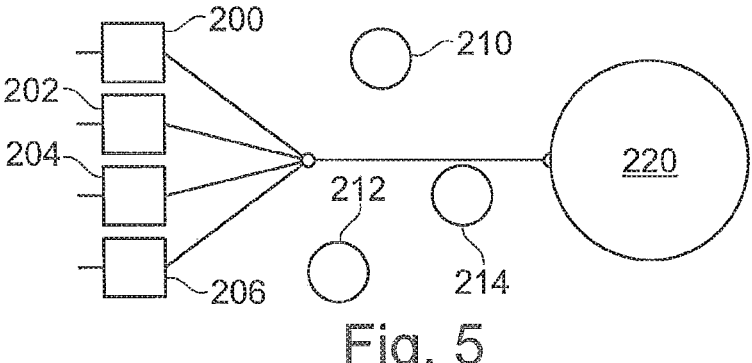
FIG. 5 represents a diagnostic system for the diagnostics of the operating condition of individual components of a sample separation apparatus.

FIG. 5 shows a diagnostic system according to an exemplary embodiment example of the invention for the diagnostics of the operating condition of individual components of a sample separation apparatus 10. The diagnostic system can be implemented in an arbitrary one of the embodiment examples according to FIGS. 1 to 4.

The principle according to FIG. 5 can be referred to as an approach for a diagnostics and/or a status detection of active and passive switching valves in an HPLC. In an HPLC, the intake flow of a high-pressure quaternary pump depends on the precise determination of a decompression point. This corresponds to a point in time, at which an inlet valve of the pump opens. During the suction phase, the volume of the primary piston of the pump is decompressed until the pressure corresponds to the ambient pressure. From this point in time onwards, any movement of the piston no longer compresses the fluid. Instead, fluid is sucked in. If this exact point in time is not determined, an error will occur regarding the calculated amount of newly sucked fluid.

The tracking of the moment, at which an inlet valve and/or a switching valve, a gradient valve, a rotor valve, or a passive/active valve opens or closes, completes the determination. Consequently, a control algorithm can be implemented, which actively reduces the intake (or sucking) error. The delay between the determined moment and the actual moment of opening of the valve can thus be reduced. The composition becomes more accurate, if real opening times are used for dosing (fluid metering).

To reduce errors, the decompression point is only calculated. However, disturbances can worsen or destroy this determination.

According to the exemplary embodiment example described herein, it is assumed that the movement of the inlet valve generates a detectable noise, pulses, acceleration, vibrations and pressure variations inside or outside of the liquid. These values can be measured by pressure sensors before and after the combining point 87 in FIG. 2, see pressure sensors 61, 62, 73, 76 there. Pressure fluctuations, which are induced by the acting valve, can be detected. It is further possible to detect hydrophone effects within the fluid columns before and/or after the inlet valve. A hydrophone is a device, which can detect noise within fluids. When this is done, other signals from the system are observed, such as for example the condition of the pump, of bearings, switching positions of valves, cavitation effects, etc. It is also possible to provide an accelerometer that tracks the movement pulses of the valves. An opening and closing of a valve induces a detectable pulse, because the valve has to move internal parts.

Another advantage of the monitoring described is the following: A rigid or liquid body, which connect(s) or join(s) the pump and/or the pump head and/or multi-channel gradient valves and/or an inlet valve, allows a further refined diagnostics and control by a reduced number of sensors. For example, it is possible to arrange a hydrophone or a microphone or an accelerometer in or near a rigid or liquid body, and to monitor noise from all connected parts of the pump unit.

FIG. 5 shows an example of an arrangement having an appropriate diagnostic capability. Reference numerals 200, 202, 204, 206 refer to four valves (for example, implemented like the switching valves 71, 72). Reference numerals 210, 212 and 214 refer to associated sensors, in particular sound sensors. Reference numeral 220 designates a pump and/or a pump head, a pressure chamber, an inlet valve and/or an outlet valve.

With the described diagnostic function it is possible to determine a reversal point of motors and pumps. Alternatively or in addition, it is possible to determine a clearance of mutually engaging parts when they are moved. Cavitation effects can be detected. A closing and/or an opening of passive and active valves can be detected. Also, the position of mechanical or fluidic events can be determined by triangulation methods.

It should be noted that the term "comprising" does not exclude other elements, and that the term "a" or "an" do not exclude a plurality. Also, elements, which are described in connection with different embodiment examples, can be combined. It should also be noted that reference numerals in the claims should not be construed as limiting the scope of protection of the claims.

The invention claimed is:

1. A fluid supply apparatus for providing a mixture of a plurality of different fluids as a mobile phase for a sample separation apparatus, the fluid supply apparatus comprising:
   a plurality of supply lines, each of which is fluidically coupled to a respective one of a plurality of fluid component sources, configured to provide a respective one of the plurality of different fluids;
   a plurality of fluid pumps, each of which is associated with a respective one of the supply lines;
   a combining point downstream of the fluid pumps and configured to combine the fluids from the supply lines to output combined fluids,
      wherein each one of the plurality of fluid pumps is switchable such that a respective fluid pump, depending on its respective switching state, pushes or does not push a respective fluid from a respective one of the fluid component sources to the combining point;
   a switching configuration comprising a plurality of switching valves, each switching valve communicating with a respective one of the supply lines and each switching valve positioned between a respective one of the fluid pumps and the combining point, wherein each switching valve is switchable between an open state that allows the respective fluid pump to convey a respective fluid from a respective one of the fluid component sources to the combining point, and a closed state that prevents the respective fluid pump from conveying the respective fluid;
   a fluid conveying device downstream of the combining point and configured as a metering device to convey the combined fluids to a chromatographic sample separation device, wherein:
      the plurality of fluid pumps is configured to bring the respective fluids to a normalized initial pressure; and
      the fluid conveying device is configured to further pressurize the combined fluids output from the combining point to a system pressure; and
   a control unit configured to control pushing and not pushing by the fluid pumps, and/or control the switching of the switching valves, to controllably define a composition of the combined fluids exiting the combining point.

2. The fluid supply apparatus according to claim 1, wherein each one of the plurality of fluid pumps runs continuously in operation such that, depending on a switching state of a respective switching valve downstream from a respective fluid pump, the respective fluid pump conveys or does not convey a respective fluid from a respective one of the fluid component sources to the combining point.

3. The fluid supply apparatus according to claim 2, wherein at least one fluidic capacity is arranged, as a fluid reservoir, between the plurality of fluid pumps and the plurality of switching valves.

4. The fluid supply apparatus according to claim 1, wherein the fluid conveying device comprises a feature selected from the group consisting of: one or more pumps; one or more piston pumps; a binary pump; a quaternary pump; and a multi-channel pump.

5. The fluid supply apparatus according to claim 1, wherein the fluid supply apparatus is free from a proportioning device.

6. The fluid supply apparatus according to claim 1, comprising at least one of the following features:
   wherein each one of the fluid pumps is configured to, in an active switching state, actively convey a respective fluid from a respective one of the fluid component sources to the combining point;

wherein each one of the fluid pumps is configured to, in an inactive switching state, not convey a respective fluid from a respective one of the fluid component sources.

7. The fluid supply apparatus according to claim 1, wherein each of the fluid pumps is selected from the group consisting of: a piston pump; a gear pump; a peristaltic pump; and a membrane pump.

8. The fluid supply apparatus according to claim 1, comprising at least one pressure sensor for detecting a value, which is indicative for a pressure in a respective one of the supply lines.

9. The fluid supply apparatus according to claim 1, comprising at least one pressure sensor downstream of the combining point.

10. The fluid supply apparatus according to claim 1, comprising a non-return valve downstream of the combining point, which is configured to prevent a backflow of conveyed fluids in the direction back to the combining point.

11. The fluid supply apparatus according to claim 1, comprising at least one sound sensor configured to detect a switching noise for monitoring the switching state of the fluid supply apparatus.

12. A sample separation apparatus for separating a fluidic sample by liquid chromatography, the sample separation apparatus comprising:

the fluid supply apparatus according to claim 1 for providing the mobile phase in the form of the fluids to be combined at the combining point;

an injector downstream of the fluid conveying device and configured to inject the fluidic sample into the mobile phase; and the chromatographic sample separation device, which is configured to separate the fluidic sample injected into the mobile phase into fractions.

13. A method of providing a mixture of a plurality of different fluids as a mobile phase for a sample separation apparatus, the method comprising:

providing a plurality of supply lines, each of which is fluidically coupled to a respective one of a plurality of fluid component sources for providing a respective one of the plurality of different fluids;

providing a plurality of fluid pumps, each of which is associated with a respective one of the supply lines;

providing a combining point downstream of the fluid pumps and configured to combine the fluids from the supply lines to output combined fluids, wherein each one of the plurality of fluid pumps is switchable such that a respective fluid pump, depending on its respective switching state, pushes or does not push a respective fluid from a respective one of the fluid component sources to the combining point;

operating the fluid pumps to bring respective ones of the fluids to a normalized initial pressure;

sequentially supplying the fluids from the supply lines to the combining point such that each one of the plurality of fluid pumps, depending on a respective switching state, pushes or does not push a respective fluid from a respective one of the fluid component sources to the combining point, wherein the sequentially supplying comprises operating a switching configuration comprising a plurality of switching valves, each switching valve communicating with a respective one of the supply lines and each switching valve positioned between a respective one of the fluid pumps and the combining point, wherein each switching valve is switchable between an open state that allows the respective fluid pump to convey a respective fluid from a respective one of the fluid component sources to the combining point, and a closed state that prevents the respective fluid pump from conveying the respective fluid;

controlling pushing and not pushing by the fluid pumps, and/or controlling the switching of the switching valves, to controllably define a composition of the combined fluids exiting the combining point; and operating a fluid conveying device downstream of the combining point as a metering device to further pressurize the combined fluids output from the combining point to a system pressure and to convey the combined fluids to a chromatographic sample separation device.

14. The method according to claim 13, wherein the system pressure is selected from the group consisting of: at least 500 bar; at least 1000 bar; and at least 1200 bar.

15. The fluid supply apparatus according to claim 1, wherein the switching configuration comprises a proportioning device for proportioning packages of the respective fluids supplied by the supply lines.

16. The fluid supply apparatus according to claim 1, wherein the fluid conveying device is configured to draw the fluids starting from the combining point.

* * * * *